(12) United States Patent
Mak (10) Patent No.: US 10,404,092 B2
(45) Date of Patent: Sep. 3, 2019

(54) SYSTEM, APPARATUS AND METHOD FOR FACILITATING WIRELESS CHARGING OF ONE OR MORE BATTERY-POWERED DEVICES

(71) Applicant: Kwan Hang Mak, Hong Kong (HK)

(72) Inventor: Kwan Hang Mak, Hong Kong (HK)

( * ) Notice: Subject to any disclaimer, the term of this patent is extended or adjusted under 35 U.S.C. 154(b) by 13 days.

(21) Appl. No.: 15/350,135

(22) Filed: Nov. 14, 2016

(65) Prior Publication Data

US 2017/0214267 A1   Jul. 27, 2017

Related U.S. Application Data

(60) Provisional application No. 62/287,450, filed on Jan. 27, 2016.

(51) Int. Cl.
*H02J 7/02* (2016.01)
*H02J 50/90* (2016.01)
(Continued)

(52) U.S. Cl.
CPC ............ *H02J 7/025* (2013.01); *H02J 7/0042* (2013.01); *H02J 7/0044* (2013.01); *H02J 50/12* (2016.02); *H02J 50/50* (2016.02); *H02J 50/90* (2016.02)

(58) Field of Classification Search
None
See application file for complete search history.

(56) References Cited

U.S. PATENT DOCUMENTS

| 2010/0201312 A1* | 8/2010 | Kirby | H02J 7/025 |
| | | | 320/108 |
| 2012/0007439 A1* | 1/2012 | Kozakai | H02J 5/005 |
| | | | 307/104 |

(Continued)

FOREIGN PATENT DOCUMENTS

| CN | 101447683 A | 6/2009 |
| CN | 201533182 U | 7/2010 |

(Continued)

OTHER PUBLICATIONS

Search Report of counterpart Hong Kong Short-term Patent Application No. 16114684.4 dated Mar. 31, 2017.

(Continued)

*Primary Examiner* — Robert J Grant
*Assistant Examiner* — Tynese V McDaniel

(57) ABSTRACT

Disclosed is a system, apparatus and method for facilitating wireless charging of one or more battery-powered devices. In accordance with the aspects of the system, apparatus and method, one or more first charging coils present in a charging device may generate and emit magnetic flux in response to power supplied to the charging device. Further, a battery cell of one or more battery-powered devices, embedded within the charging device, may include a second charging coil. The second charging coil may receive the magnetic flux emitted based upon a resonant coupling formed between the one or more first charging coils and the second charging coil. The magnetic flux received may induce an electric current within the one or more battery-powered devices. The electric current induced may be utilized for simultaneously charging the battery cell of the one or more battery-powered devices.

20 Claims, 7 Drawing Sheets

(51) Int. Cl.
*H02J 50/12* (2016.01)
*H02J 7/00* (2006.01)
*H02J 50/50* (2016.01)

(56) References Cited

U.S. PATENT DOCUMENTS

| | | | |
|---|---|---|---|
| 2013/0015699 A1* | 1/2013 | Mita | H02J 5/005 307/9.1 |
| 2013/0049484 A1* | 2/2013 | Weissentern | H02J 5/005 307/104 |
| 2014/0292100 A1* | 10/2014 | Lee | H01F 38/14 307/104 |
| 2015/0303705 A1* | 10/2015 | Leem | H02J 17/00 307/104 |
| 2016/0218539 A1* | 7/2016 | Herrmann | H02J 7/008 |

FOREIGN PATENT DOCUMENTS

| | | |
|---|---|---|
| CN | 201617286 U | 11/2010 |
| CN | 202004493 U | 10/2011 |
| CN | 102318161 A | 1/2012 |
| CN | 103931078 A | 7/2014 |
| CN | 104638695 A | 5/2015 |
| CN | 204908346 U | 12/2015 |

OTHER PUBLICATIONS

International Search Report of PCT Patent Application No PCT/CN2016/111833 dated Mar. 27, 2017.

Shiyan Yang et al., Electrical Energy Conversion and Equalization Techniques for Series-connected Energy Storage System, Jan. 1, 2014, pp. 121-124, Harbin Institute of Technology Press.

* cited by examiner

SYSTEM, APPARATUS AND METHOD FOR FACILITATING WIRELESS CHARGING OF ONE OR MORE BATTERY-POWERED DEVICES

CROSS-REFERENCE TO RELATED APPLICATIONS AND PRIORITY

The present application claims priority from U.S. Provisional Patent Application No. 62/287,450 dated Jan. 27, 2016, incorporated herein as a reference.

TECHNICAL FIELD

The present subject matter described herein, in general, relates to a system, apparatus and method for facilitating wireless charging of one or more battery-powered devices.

BACKGROUND

With the advent of communication technology, smart communication devices have been used in various commercial, business, personal, consumer, and other applications. One such smart communication device is a motion sensing garment configured for monitoring motion and biometric data of an individual via inbuilt sensors present within the motion sensing garment. In order to continuously monitor the motion and the biometric data, the motion sensing garment along with the sensors therein need to be supplied with an electrical power. The motion sensing garment typically includes multiple internal batteries configured for charging the motion sensing garment along with the inbuilt sensors and other electronic components within the motion sensing garment.

In the existing scenario, the internal batteries have to be charged initially using an external power supply/charger before being used to charge the motion sensing garment itself. If the internal batteries are not physically connected, then the external power supply is utilized for charging one battery at a time which is both cumbersome and time-consuming. A resonance based wireless charger has been proposed in the art that facilitates wireless charging of multiple batteries simultaneously. However, in order to effectively and efficiently charge the batteries, a perfect alignment and an effective distance is to be maintained between the batteries and the wireless charger. Any deviation in the alignment and the distance may result in failure of charging of the batteries by the wireless charger.

SUMMARY

This summary is provided to introduce concepts related to systems, apparatuses and methods for facilitating charging of one or more battery-powered devices and the concepts are further described below in the detailed description. This summary is not intended to identify essential features of the claimed subject matter nor is it intended for use in determining or limiting the scope of the claimed subject matter.

In one implementation, a wireless charging system is disclosed. The wireless charging system may include a charging device comprising one or more first charging coils. The one or more first charging coils may generate and emit magnetic flux in response to power supplied to the charging device. Further, the wireless charging system may include one or more battery-powered devices embedded within the charging device. In one aspect, a battery cell of the one or more battery-powered devices may comprise a second charging coil. The second charging coil may receive the magnetic flux emitted based upon a resonant coupling formed between the one or more first charging coils and the second charging coil. In one aspect, the magnetic flux received may induce an electric current within the one or more battery-powered devices. The electric current induced may be utilized for simultaneously charging the battery cell of the one or more battery-powered devices.

In another implementation, a method for facilitating wireless charging of one or more battery-powered devices is disclosed. The method may include providing a wireless system comprising a charging device embedded with one or more battery-powered devices. The charging device may comprise one or more first charging coils. Further, the one or more battery-powered devices may comprise a battery cell embedding a second charging coil. The method may further include generating and emitting, by the one or more first charging coils, magnetic flux in response to power supplied to the charging device. Further, the method may include receiving, by the second charging coil, the magnetic flux emitted based upon a resonant coupling formed between the one or more first charging coils and the second charging coil. Further, the method may include inducing, by the second charging coil, an electric current within the one or more battery-powered devices based upon the magnetic flux received. The electric current induced may be utilized for simultaneously charging the battery cell of the one or more battery-powered devices.

In yet another implementation, a wireless charging apparatus is disclosed. The wireless charging apparatus may include a charging device accommodating one or more battery-powered devices. The charging device may further include one or more first charging coils. The one or more first charging coils may generate and emit magnetic flux in response to power supplied to the charging device. The magnetic flux emitted may be received by a second coil present within a battery cell of the one or more battery-powered devices. The magnetic flux received may induce an electric current, wherein the electric current induced is utilized for charging the battery cell of the one or more battery-powered devices simultaneously. The charging device may further include a display interface for indicating the status of the charging of the battery cell of the one or more battery-powered devices. The wireless charging apparatus may further include a power source for supplying the power to the charging device and the display interface. The power source may further be connected to the charging device via a wired connection or a USB connector or a battery pack itself.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

System, apparatus, and method for facilitating wireless charging of one or more battery-powered devices are described. In accordance with the system, apparatus, and method of the present application, a charging device having a shape of a pouch may be provided. The charging device may comprise one or more first charging coils (hereinafter referred as transmitter coils interchangeably). The charging device may further embed the one or more battery-powered devices. The one or more battery-powered devices may be selected from smartphones, tablet computers, wearable devices and combinations thereof. It must be understood that the charging device may embed the one or more battery-powered devices in order to charge the one or more battery-powered devices.

In order to facilitate the wireless charging of the one or more battery-powered devices, a transmitter coil may generate and emit magnetic flux (hereinafter referred as "magnetic field" or "magnetic flux lines" interchangeably) in response to power supplied to the charging device. The power may be supplied to the charging device using a power source connected to the charging device via a wired connection or a USB connector or a battery pack. Based upon the emission of the magnetic flux, a second charging coil (hereinafter referred as receiver coil interchangeably) present within a battery cell of the one or more battery-powered devices may receive the magnetic flux emitted by the transmitter coil.

It is to be noted that the one or more battery-powered devices may be loosely coupled with the charging device. The loose coupling may result in random orientation of the receiver coil within the one or more battery-powered devices. In one example, the receiver coil may orient in different angles and at different distances from that of the transmitter coil. The random orientation therefore results in imperfect alignment between the transmitter coil and the receiver coil. Therefore, since the alignment of the transmitter coil and the receiver coil is variable and not constant/fixed, the present system facilitates the reception of the magnetic flux by the receiver coil based upon a resonant coupling (also referred as a resonant inducting coupling) formed between the transmitter coil and the receiver coil. The resonant coupling may enable the magnetic flux generated by the one or more first charging coils and the magnetic flux received by the second coil to resonate at a same frequency and forming a resonated LC circuit.

Based upon the resonant coupling formed, the magnetic field is transferred from the transmitter coil to the receiver coil. It must be understood that the transfer of magnetic field herein indicates transfer of energy from the transmitter coil to the receiver coil. The transfer of magnetic field therefore induces an electric current within the battery powered device via an electromagnetic induction. The electric current may further be utilized to simultaneously charge the battery cell of the one or more battery-powered devices. It is to be noted that the efficiency of electric current induced by the magnetic flux received via the resonant coupling is based upon a coupling coefficient and a quality factor between the transmitter coil and the receiver coil. Specifically, high energy transfer efficiency may be achieved with high coupling coefficient and high quality factor.

It is to be noted that the coupling coefficient is between 0-1. The tighter the coupling between the one or more battery-powered devices and the charging device, higher is the value of the coupling efficient. It is to however noted that since the alignment between the transmitter coil and the receiver coil is imperfect due to random orientation of the receiver coil, the coupling coefficient between the transmitter coil and the receiver coil is very low. However, based upon the high quality factor of the transmitter coil and the receiver coil, small magnetic field emitted may be received by the receiver coil via resonance effect created between the transmitter coil and the receiver coil. Further, by implementing multiple such cycles of resonance wherein the magnetic field is continuously emitted by the transmitter coil, and wherein the magnetic field is continuously received by the receiver coil, a significant amount of energy transfer takes place back and forth between the transmitter coil and the receiver coil. Further, the energy transfer may result in inducing the reasonable electric current to be utilized for charging the battery cell of the one or more battery-powered devices.

Therefore, the present application facilitates charging of the multiple battery-powered devices embedded within the charging devices even though the alignment between the transmitter coil of the charging device and the receiver coil in the battery cell of the multiple battery-powered devices is variable with different angles and distances. Thus, the present application facilitates effective charging of the battery-powered devices even though the battery-powered devices are loosely coupled with the charging device and thereby having low coupling effect between the transmitter coil in the charging device and the receiver coil in the battery cell of each battery-powered device.

In one embodiment, in order to achieve high coupling effect, the charging device may employ more than one transmitter coils for generating and emitting the magnetic fields. In this embodiment, one of the transmitter coils may be positioned directionally opposite to the other transmitter coil within the charging device. The receiver coil may be positioned in between the two transmitter coils. It must be understood that one of two transmitter coils having stronger coupling effect with the receiver coil may act as a primary transmitter coil for emitting the magnetic flux to the receiver coil. The two transmitter coils may enable a reasonable alignment between the primary transmitter coil and the receiver coil irrespective of which side the receiver coil is faced. The back of the receiver coil may include a shielding material for magnetic blockage.

In another embodiment, one of the two transmitter coils may act as an extended transmitter coil positioned at an extended distance (large distance) from the other transmitter coil. The receiver coil may be positioned in between the two transmitter coils. The extended transmitter coil may enhance/extend the strength and the distance of the magnetic flux emitted by the other transmitter coil. The extended transmitter coil may act as a resonator adapted to amplify/enhance the oscillating magnetic flux emitted from the other transmitter coil based on the resonance effect. It is to be noted that the extended transmitter coil and the other transmitter coil are magnetically coupled coils with a high quality factor and may be resonated at same resonant frequency.

Therefore, magnetic field of low intensity from the other transmitter coil may be received by the extended transmitter coil via resonance effect created between the extended transmitter coil and the other transmitter coil. The magnetic field received is having low intensity due to the extended distance between the extended transmitter coil and the other transmitter coil. However, by implementing multiple such cycles of resonance wherein the magnetic field is continuously emitted by the other transmitter coil, and wherein the magnetic field is continuously received by the extended transmitter coil, a significant amount of energy transfer takes place back and forth within the extended distance between the extended transmitter coil and the other transmitter coil. Further, the energy transfer may result in enhancing the charging efficient of the receiver coil positioned in between the two transmitter coils thereby enhancing efficiency of the electric current induced within the one or more battery-powered devices. The electric current, with enhanced efficiency, charges the battery cell of the one or more battery-powered devices.

While aspects of described system, apparatus and method for facilitating wireless charging of the one or more may be implemented in any number of different computing systems, apparatuses, environments, and/or configurations, the embodiments are described in the context of the following exemplary system.

It must be noted to one skilled in the art that though the systems/methods/apparatus of the present application have been described by referring to wireless charging of sensors of a wearable device embedded within the wireless charging system, however, the description and the figures are for illustrative purpose only and the present application is not limited to charge the sensors belonging to the wearable device alone but may be extended to wireless charging of any battery-powered device that may be embedded within the wireless charging system, described in detail as below.

Figure 1:
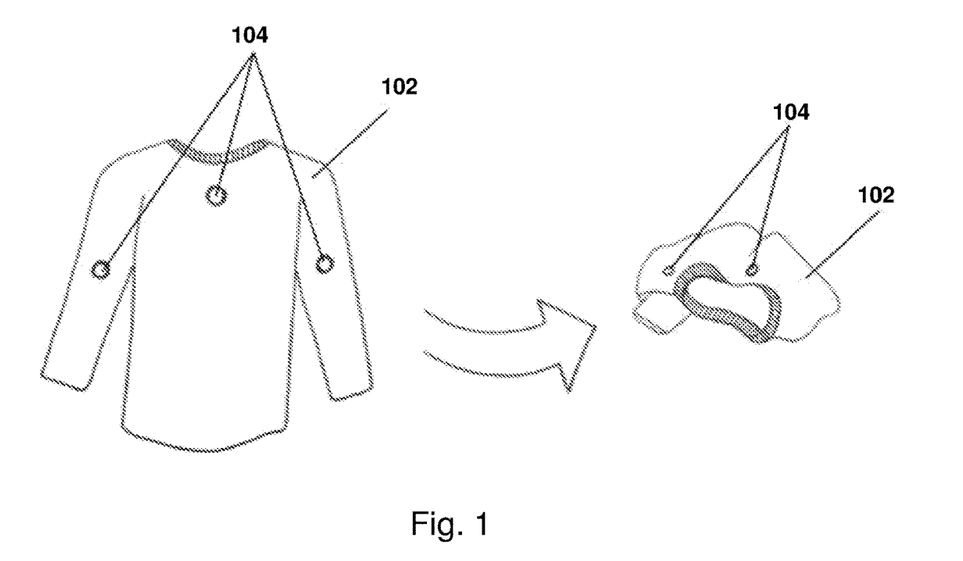
FIG. 1 illustrates a garment 102 containing one or more battery-powered devices 104 (e.g. sensors 104), wherein the garment 102 is easily folded inside a charging device of a wireless charging apparatus 300 (shown in FIG. 3), in accordance with an embodiment of the present application.

Now referring to FIG. 1, a garment 102 (hereinafter also referred as "a motion sensing garment 102" interchangeably) containing one or more battery-powered devices 104 (hereinafter also referred as "sensors 104" interchangeably) is illustrated, in accordance with an embodiment of the present application. As shown in FIG. 1, the sensors 104 are embedded within the garment 102. The sensors 104 may monitor motion data and biometric data of a user wearing the garment 102. Since, multiple motion activities of the user are to be monitored, multiple sensors 104 are embedded within the single garment 102 as shown. In order to monitor the motion data and the biometric data, the batteries of the multiple sensors 104 are required to be charged. The present application facilitates wireless charging of the battery cells of each of the multiple sensors 104 simultaneously.

Figure 2:
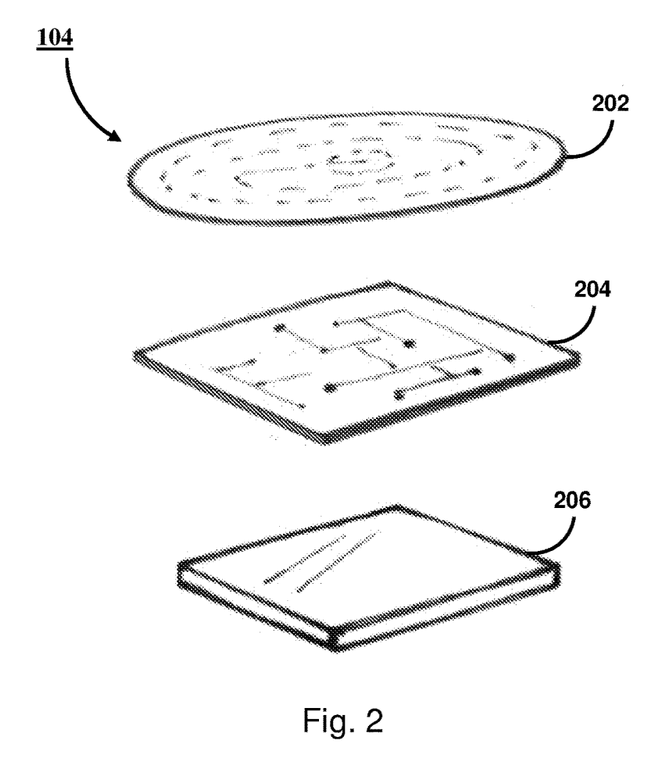
FIG. 2 illustrates the sensor 104, in accordance with an embodiment of the present application.
Figure 3:
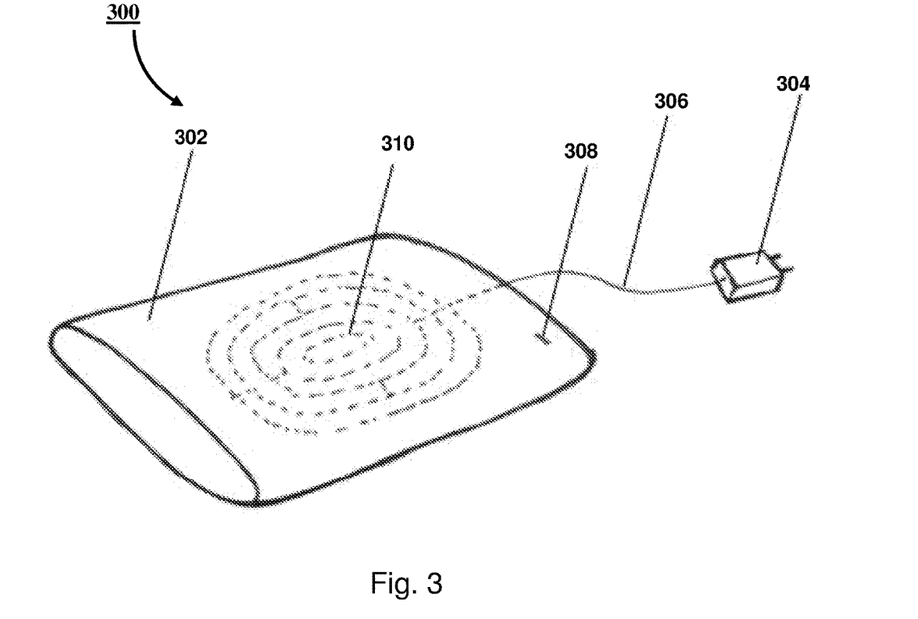
FIG. 3 illustrates the wireless charging apparatus 300 comprising a charging device 302 (e.g. a charging pouch 302) connected to a power source 304 via a cable 306, in accordance with an embodiment of the present application.

In order to charge the batteries of the sensors 104, the user may put the motion sensing garment 102 into a charging device 302 of a wireless charging apparatus 300 shown in FIG. 3. As shown in FIG. 1, the motion sensing garment 102, containing the sensors 104, may be easily folded inside the charging device 302. Referring to FIG. 3, the charging device 302 may have a shape of a pouch. Hereinafter the charging device 302 will be interchangeably referred as a "charging pouch 302". As shown in FIG. 3, the charging pouch 302 may be positioned horizontally. The charging pouch 302 enclosing the motion sensing garment 102 along with the sensors 104 may be connected to a power source 304 via a wired cable 306 in order to charge the batteries of the sensors 104. The wireless charging apparatus 300 may further comprise an LED indicator 308 for indicating the charging status of the batteries of the sensors 104. The charging pouch 302 may comprise one or more first charging coils 310 (hereinafter referred as "transmitter coils 310" interchangeably). In one example, the transmitter coil 310 may be a copper wire coil. Each of the transmitter coils 310 are capable of generating flux lines (hereinafter also referred as "magnetic flux" or "magnetic field" interchangeably) in response to the power supplied to the charging pouch 302 via the power source 304. In an embodiment, the power source 304 is a DC power supply and hence provides a Direct Current (DC) which may be converted into an Alternating Current (AC). The Alternating Current (AC) may energize the transmitter coil 310 in order to generate the magnetic field or the magnetic flux. The magnetic flux generated may be emitted by the transmitter coil 310 towards the direction of each sensor 104 embedded within the charging pouch 302. FIG. 2 illustrates the sensor 104, in accordance with an embodiment of the present application.

Figure 4:
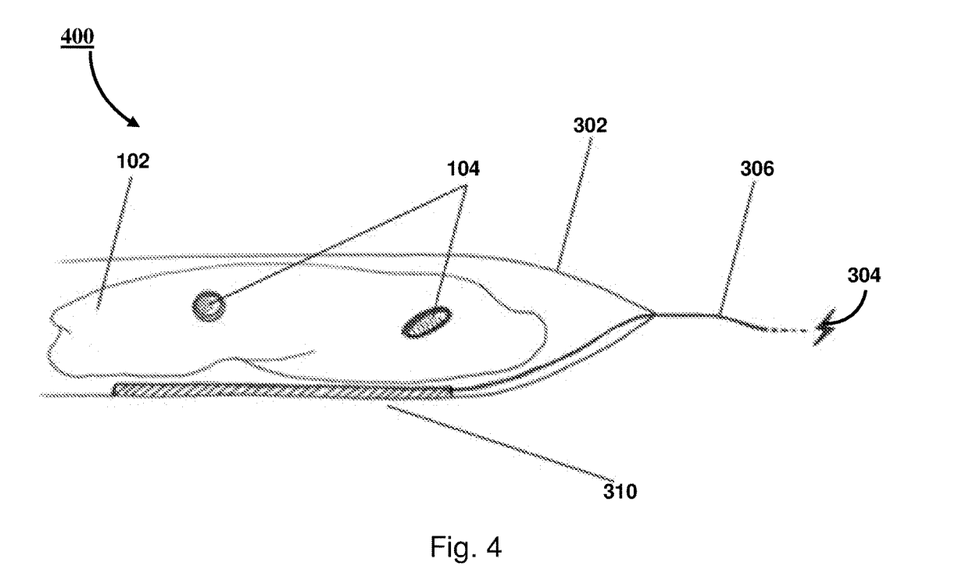
FIG. 4 illustrates a wireless charging system 400 depicting the charging pouch 302 embedded with the sensors 104 oriented in different directions inside the charging pouch 302, in accordance with an embodiment of the present application.

As shown in FIG. 2, the sensor 104 may comprise a second charging coil 202 (hereinafter referred as receiver coil 202), a printed circuit board 204 with electronic components of the sensor 104, and a battery cell 206. In one example, the receiver coil 202 may be a copper wire coil. In one embodiment, the receiver coil 202 may be present within the battery cell 206. As shown in FIG. 1, the motion sensing garment 102 containing the sensors 104 may be loosely folded within the charging pouch 302. Therefore, the sensors 104 may be oriented in different directions thereby resulting in random orientation of the receiver coil 202 of each sensor 104. FIG. 4 illustrates a wireless charging system 400 depicting the charging pouch 302 embedding the sensors 104 oriented in different random directions inside the charging pouch 302. As shown in FIG. 4, since the sensors 104 are oriented in different directions, the receiver coil 202 (not shown) in each sensor 104 may be oriented in different directions. This, in turn, results in imperfect alignment between the transmitter coil 310 and the receiver coil 202. In one example, the alignment between the transmitter coil 310 and the receiver coil 202 may result in different angles and different distances due to the random orientation of the sensors 104 within the charging pouch 302.

Figure 5:
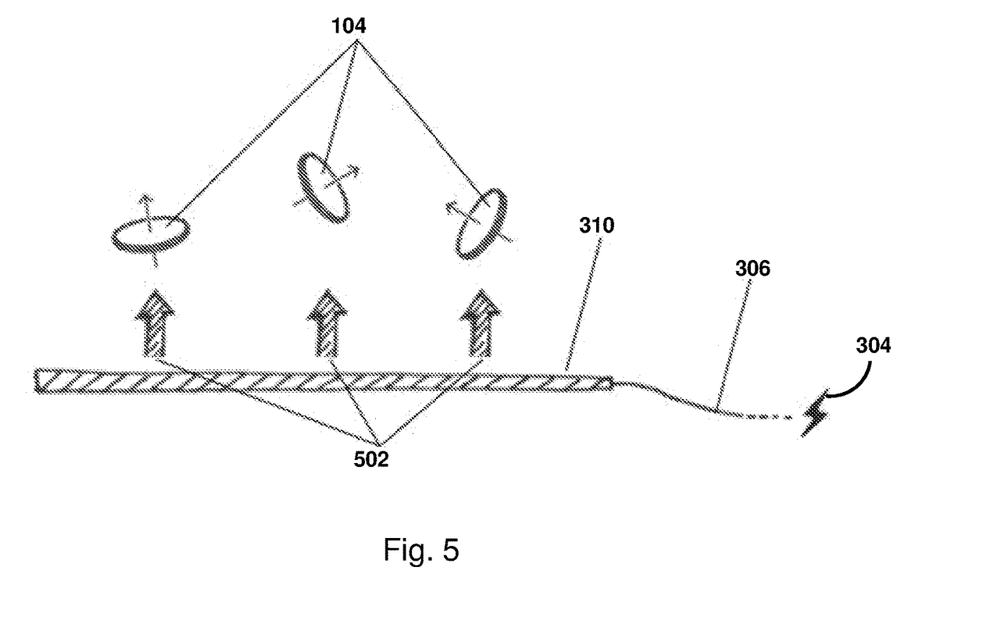
FIG. 5 illustrates a first charging coil 310 (also referred as a transmitter coil 310) in the charging pouch 302 emitting magnetic flux lines 502 which are passing through a second charging coil or a receiver coil (not shown) in each of the sensors 104, in accordance with an embodiment of the present application.

In accordance with various embodiments of the present application, the receiver coil 202 within the battery cell 206 may be capable of inducing an electric current when the battery cell 206 is positioned in close proximity of the transmitter coil 310 emitting the magnetic flux within the charging pouch 302. The present wireless system 400 does not require perfect alignment between the transmitter coil 310 and the receiver coil 202 in order to effectively/efficiently charge the battery cell of each sensor 104. As shown in FIG. 5, the transmitter coil 310 may generate and emit magnetic flux lines 502 in the direction of the sensors 104 within the charging pouch 302. As shown in FIG. 5, the magnetic flux lines 502 emitted from the transmitter coil 310 may be passed through the receiver coil 202 (not shown) of the sensors 104 oriented in different directions. Therefore, the receiver coil 202 of each of the three sensors 104 are oriented in different directions thereby resulting in the imperfect alignment between the transmitter coil 310 and the receiver coil 202 of each of the sensors 104.

In an embodiment, the magnetic flux 502 emitted by the transmitter coil 310 may be received by the receiver coil 202 via a resonant coupling established between the transmitter coil 310 and the receiver coil 202. Therefore, the magnetic field may be oscillated between the transmitter coil 310 and the receiver coil 202. The resonant coupling may enable the transfer of energy from the magnetic field oscillating between the transmitter coil 310 and the receiver coil 202. The transmitter coil 310 and the receiver coil 202 may resonate with same resonant frequency and form a resonated LC circuit. As it is known, the resonant frequency of the LC circuit is $\omega_0 = 1/\sqrt{LC}$, wherein the "$\omega_0$" is the resonant frequency, "L" is the inductance of the LC circuit and the "C" is the inductance of the LC circuit.

The transfer of the magnetic field from the transmitter coil 310 to the receiver coil 202 facilitates in transfer of energy from the transmitter coil 310 to the receiver coil 202 Based upon the transfer of energy from the transmitter coil 310 to the receiver coil 202, the receiver coil 202 may induce an electric current within the printed circuit board 204 of each of the sensors 104 due to electromagnetic induction. Specifically, the oscillating magnetic field received by the receiver coil 202 may exert oscillating force on the electrons in the receiver coil 202 thereby causing the electrons to move back and forth within the receiver coil 202. The movement of electrons within the receiver coil 202 may induce an Alternating Current (AC). The Alternating Current may be converted into a Direct Current (DC) used to charge the battery cell 206 of each sensor 104.

In order to facilitate high energy transfer and thereby inducing the current of high magnitude, the transmitter coil 310 is required to be tightly coupled with the receiver coil 202. However, since the sensors 104 are oriented in random directions, the alignment between the transmitter coil 310 and the receiver coil 202 is variable and may not be fixed. Thus, the present wireless charging system 400 enables establishing the resonant coupling between the transmitter coil 310 and the receiver coil 202. The transmitter coil 310 and the receiver coil 202 resonate at the same resonant frequency for enhancing the energy transfer efficiency between the transmitter coil 310 and the receiver coil 202 spaced at a larger distance. It is to be noted that the efficiency of energy transfer facilitated through the resonant coupling may be dependent upon a coupling coefficient and a quality of factor between the transmitter coil 310 and the receiver coil 202.

The coupling coefficient is within a predefined range of 0-1. It must be noted the that tighter the coupling between the transmitter coil 310 and the receiver coil 202, higher is the coupling coefficient between the transmitter coil 310 and the receiver coil 202. The quality factor is a parameter describing the characteristic of the resonant material. The high quality factor in the coils avoids damping, loss of energy and long cycles during oscillation.

It must be noted that since the sensors 104 are loosely coupled with the charging pouch 302, the alignment between the transmitter coil 310 and the receiver coil 202 is in different angles and different distances. Thus, the coupling coefficient between the transmitter coil 310 and the receiver coil 202 is low. However, by employing the transmitter coil 310 and the receiver coil 202 having the high quality factor, an oscillating magnetic field of small magnitude may be received by the receiver coil 202. By implementing multiple such cycles of resonance, a significant amount of energy may be generated and transmitted from the transmitter coil 310 to the receiver coil 202. The energy received by the receiver coil 202 enhances the current induced within the sensor thereby enhancing the charging rate of the battery cell of each sensor. In some embodiments, the battery-powered device (e.g. sensor 104) containing the receiver coil 202 may not even require a separate/dedicated battery to start and operate the said battery-powered device. In these embodiments, the battery-powered device (i.e. the sensor 104) may be started and ready to operate based upon electric energy received by the receiver coil 202 from the transmitter coil 310.

Figure 6:
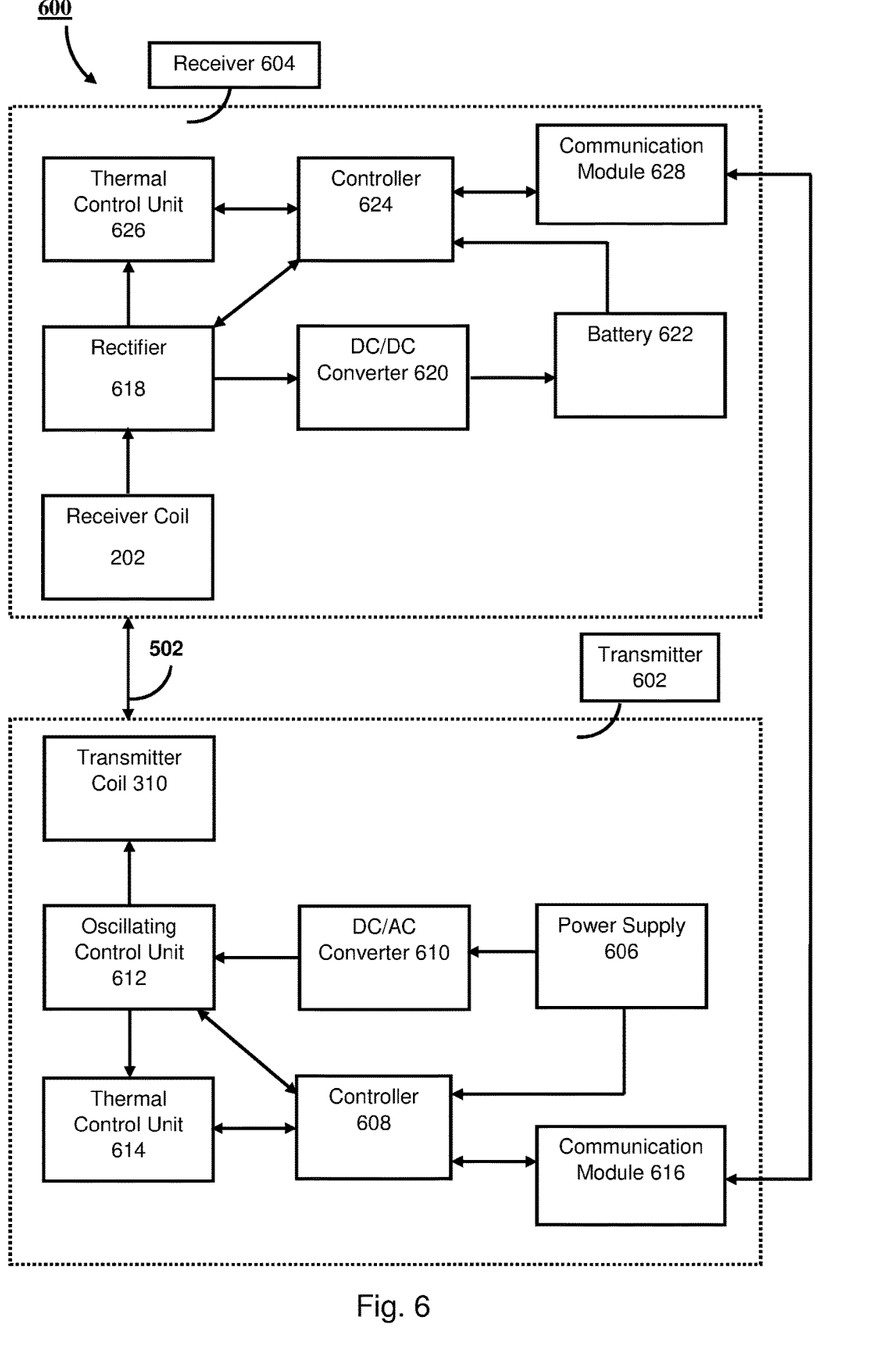
FIG. 6 illustrates a block diagram 600 depicting working of multiple electronic components within the charging pouch 302, in accordance with an embodiment of the present application.

Referring to FIG. 6 is a block diagram 600 illustrating various electronic components of the charging pouch 302, wherein the electronic components collectively facilitates in wireless charging of the battery cells of the sensors 104. As illustrated in FIG. 6, the electronic components are present within a transmitter 602 and a receiver 604 of the charging pouch 302. The transmitter 602 may include a power supply 606, a controller 608, a Direct Current-to-Alternating Current (DC/AC) converter 610, an oscillating control unit 612, the transmitter coil 310, a thermal control unit 614, and a communication module 616. Further, the receiver 604 may include the receiver coil 202, a rectifier 618, a Direct Current-to-Direct Current (DC/DC) converter 620, a battery 622, a controller 624, a thermal control unit 626, and a communication module 628.

Now referring to FIG. 6, the power supply 606 within the transmitter 602 is a DC power supply and hence may be configured to supply DC power to the controller 608. Further, the DC power from the power supply 606 is passed to the DC/AC converter 610. The DC/AC converter 610 may convert the DC power into an AC power. The AC power may be supplied to the oscillating control unit 612. The oscillating control unit 612 may act as an electronic filter ensuring that the magnetic fields generated by the transmitter coil 310 oscillates with the same resonant frequency. The AC power may further be transferred to the transmitter coil 310. The transmitter coil 310 may use the AC power to generate and emit an oscillating magnetic flux 502 in the direction of the receiver 604. The thermal control unit 614 may monitor the temperature within the transmitter 602 and alerts the controller 608 as-soon-as the transmitter 602 is overheated. The controller 608 may regulate the oscillating control unit 612. Further, the controller 608 may include a feedback loop capable of detecting status of the resonant coupling established between the transmitter coil 310 and the receiver coil 202 and thereby regulate the power output from the oscillating control unit 612 to the transmitter coil 310 by controlling the oscillating control unit 612.

Further, referring to FIG. 6, the oscillating magnetic flux 502 emitted by the transmitter coil 310 may be received by the receiver coil 202 within the receiver 604. The receiver coil 202 may transform the magnetic flux 502 into an Alternating Current. The rectifier 618 may convert the Alternating Current into a directing current (DC). The DC/DC converter 620 may transform a voltage level of the DC current, generated by the rectifier 618, in order to meet the voltage requirements for charging the battery 622. The battery 622 being charged may be configured to store electric energy to be utilized for supplying the power to the controller 624 and other circuits. The thermal control unit 626 may monitor the temperature within the receiver 604 and alerts the controller 624 as-soon-as the receiver 604 is overheated. The controller 624 may regulate the rectifier 618. Further, the controller 608 may include a feedback loop capable of detecting status of the resonant coupling established between the receiver coil 202 and the transmitter coil 310.

As shown in FIG. 6, the transmitter 602 and the receiver 604 further comprise the communication module 616 and a communication module 628 respectively. The communication modules (616, 628) may be configured to exchange information amongst the transmitter 602 and the receiver 604 within the charging pouch 302 via a communication protocol selected from a Bluetooth, ZigBee, Wi-Fi, and the like. The information exchanged between the transmitter 602 and the receiver 604 may include, but not limited to, operating current and voltage, type of the coils and the like. Based upon the information exchanged, the controller 608 and the controller 624 coupled with the communication module 616 and the communication module 628, respectively, may optimize one or more charging parameters of the wireless charging system, wherein the more charging parameters, being optimized, may include an oscillating/resonant frequency, a power, an operating current and an operating voltage.

According to embodiments of the present application, the charging efficiency of the battery cells within the sensors 104 may further be enhanced by incorporating more than one transmitter coils 310 within the charging pouch 302. The advantage of employing multiple transmitter coils is to extract magnetic flux from the multiple transmitter coils concurrently such that the receiver coil 202 may utilize the magnetic fluxes received from the multiple transmitter coils to charge the battery cells of the sensors 104 simultaneously. Further, the multiple transmitter coils may lead to increase in effective distance within the charging pouch 302. Therefore, the charging pouch 302 may be provided such that the charging pouch 302 is capable of embedding thicker wearable devices for charging their batteries via the charging pouch 302.

Figure 7:
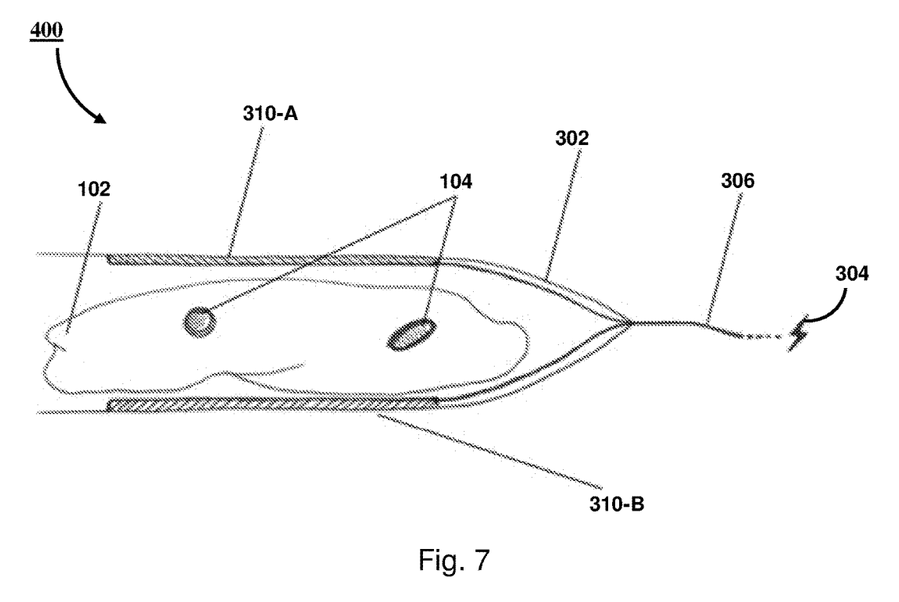
FIG. 7 illustrates the wireless charging system 400 depicting two transmitter coils (310-A, 310-B) embedded within the charging pouch 302, in accordance with an embodiment of the present application.
Figure 8:
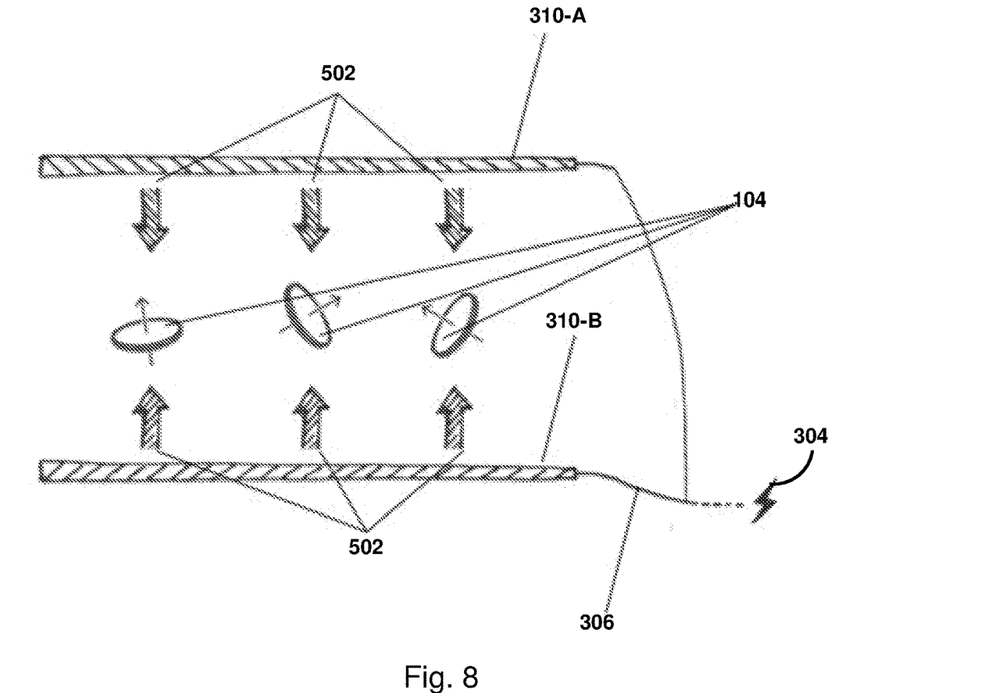
FIG. 8 illustrates the two transmitter coils (310-A, 310-B) emitting the magnetic flux lines 502 which are passing through a receiver coil (not shown) in each of the sensors 104, in accordance with an embodiment of the present application.

In one embodiment, two transmitter coils may be embedded within the charging pouch 302 such that one of the transmitter coils is in an opposite direction to that of the other transmitter coil and the receiver coil is positioned within the two transmitter coils. As shown in FIG. 7 and FIG. 8, two transmitter coils (310-A, 310-B) are being placed at vertically opposite directions in the charging pouch 302. In a preferred embodiment, the charging pouch 302 may be positioned horizontally. The receiver coil 202 may be placed in between the two transmitter coils (310-A, 310-B). As described above, due to large deviation between a single transmitter coil and a receiver coil, a weak coupling is established between the said single transmitter coil and the receiver coil. Due to weak coupling, the energy transfer into the receiver coil may be significantly reduced with high electromagnetic emission thereby leading to reduction in amount of current induced for charging the batteries.

Therefore, in order to achieve high coupling effect, two transmitter coils (310-A, 310-B) are being deployed such that the alignment between the transmitter coils (310-A, 310-B) and the receiver coil is not largely deviated. As shown in FIG. 8, both the transmitter coils (310-A, 310-B) are capable of emitting the magnetic flux 502 (magnetic fields) in the direction of the receiver coil 202. In a preferred embodiment, one of the two transmitter coils having stronger coupling effect with the receiver coil 202 may act as a primary transmitter for emitting the magnetic field to the receiver coil 202 in order to facilitate the charging of the sensors 104. The magnetic fields transmitted by both the transmitter coils (310-A, 310-B) may lead to cancelling effect between the two magnetic fields. In order to avoid the cancelling effect, the present system may include a shielding material at rear side of the receiver coil 202. The shielding material may facilitate in magnetic blockage. Further, since the two transmitter coils (310-A, 310-B) may generate and emit the magnetic flux 502 simultaneously, a magnetic interference may be resulted between the two magnetic fields. Therefore, the two transmitter coils (310-A, 310-B) may need to be separated from each other by a specific distance thereby avoiding the magnetic interference.

In another embodiment, the energy transfer may be further enhanced by creating a resonance effect between the two transmitter coils. In this embodiment, the two transmitter coils may be separated by an extended distance which is significantly larger than the distance maintained between the transmitter coils 310-A and 310-B (shown in FIG. 7 & FIG. 8). In this embodiment, the transmitter coil placed at the extended distance from the other transmitter coil is referred as an "extended transmitter coil". The extended transmitter coil may enhance and extend the strength and the distance of the magnetic flux emitted by the other transmitter coil.

Figure 9:
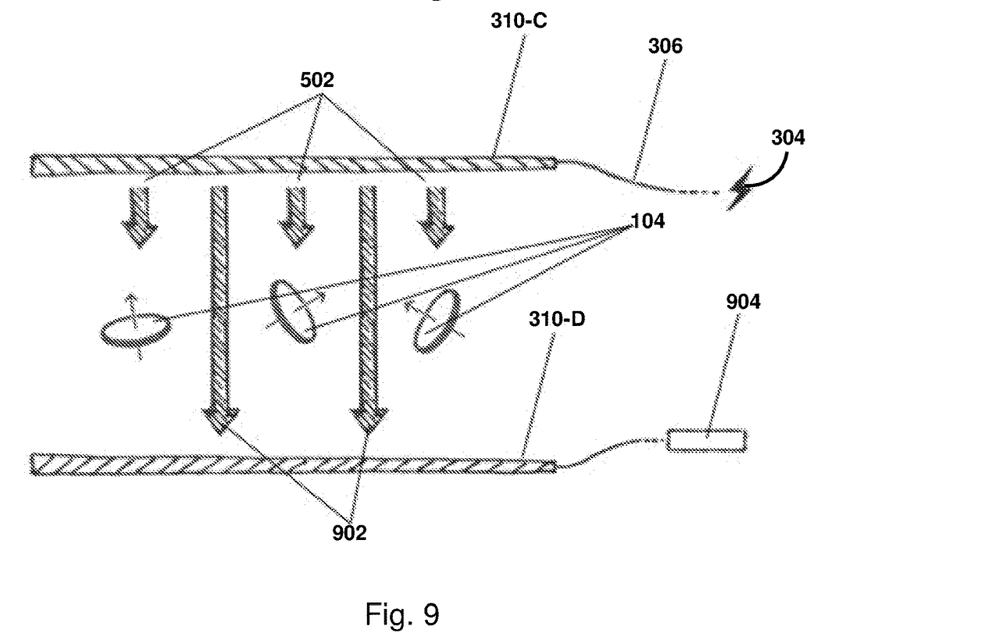
FIG. 9 illustrates a transmitter coil 310-C emitting the flux lines 902 which are received by an extended transmitter coil 310-D, in accordance with an embodiment of the present application.
Figure 10:
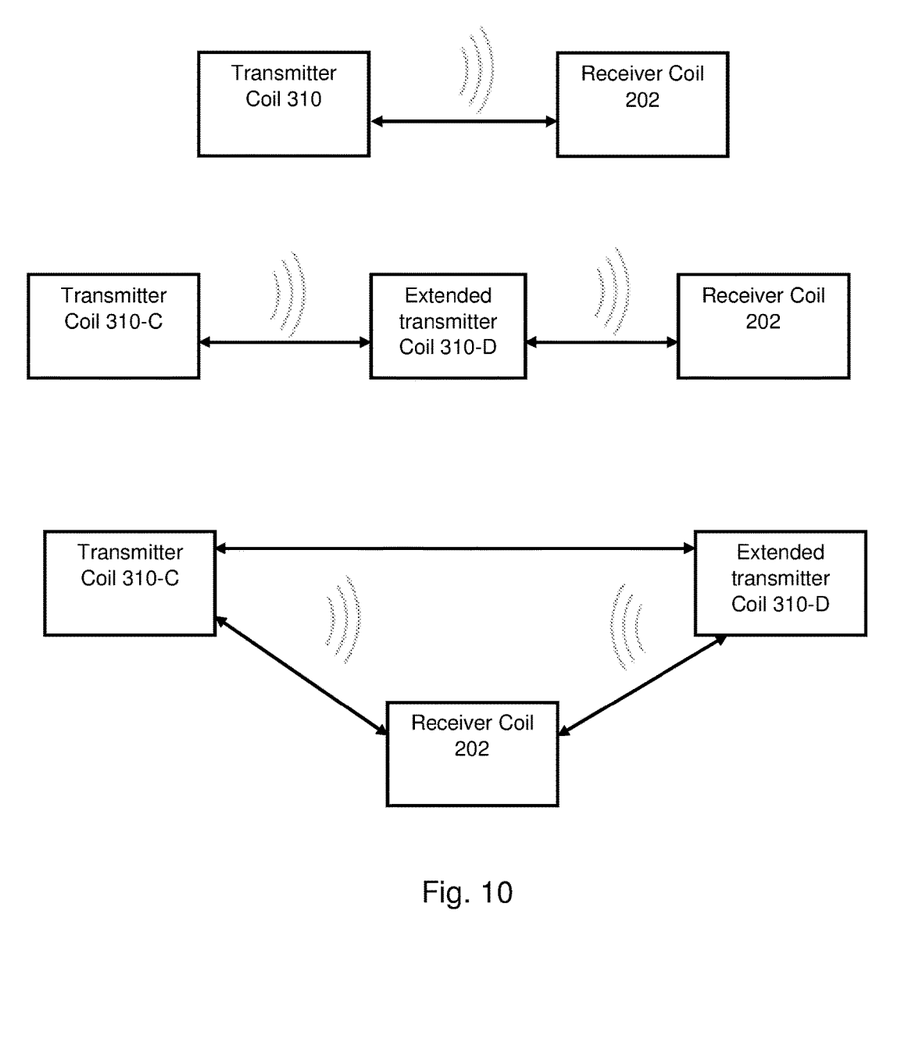
FIG. 10 illustrates working of the extended transmitter coil 310-D in enhancing the flux lines 902 emitted by the transmitter coil 310-C, in accordance with an embodiment of the present application.

FIG. 9 illustrates a transmitter coil 310-C emitting the flux lines 902 which are received by an extended transmitter coil 310-D. Further, FIG. 10 illustrates working of the extended transmitter coil 310-D in enhancing the flux lines 902 emitted by the transmitter coil 310-C. In accordance with embodiments of the present application, the receiver coil 202 may be positioned in between the transmitter coil 310-C and the extended transmitter coil 310-D. Referring to FIG. 9, the extended transmitter coil 310-D may act as a resonator for amplifying or enhancing the magnetic flux 902 emitted by the transmitter coil 310-C based on a resonance effect created within the resonance cavity. In one embodiment, the extended transmitter coil 310-D may be connected to an optional battery pack 904 acting as a standby power supply as an alternative to the power source 304. The battery pack 904, optionally provided, may be adapted to store electrical energy to supply power to the charging device in absence of the power supplied via the power source 304. The transmitter coil 310-C and the extended transmitter coil 310-D are the magnetically coupled coils with high quality factor. Based on the resonance effect created, the transmitter coil 310-C and the extended transmitter coil 310-D may resonate at same resonance frequency. The resonance effect may result in generating and emission of an oscillating magnetic flux from the transmitter coil 310-C to the extended transmitter coil 310-D. However, since the extended transmitter coil 310-D is spaced at the extended distance (i.e. a reasonable far distance), the oscillating magnetic flux emitted is of low intensity. Therefore, in order to generate energy of significant amount, multiple such resonance cycles may be implemented within the charging pouch 302 wherein during each resonance cycle, a magnetic flux is generated and emitted by the transmitter coil 310-C and the said magnetic flux is received by the extended transmitter coil 310-D. Such continuous transfer of the magnetic flux from the transmitter coil 310-C to the extended transmitter coil 310-D enables back-and-forth transfer of energy within the extended distance between the transmitter coil 310-C and the extended transmitter coil 310-D. Furthermore, due to the back-and-forth transfer of energy between transmitter coil 310-C and the extended transmitter coil 310-D, the charging efficiency of the receiver coil 202 in between the transmitter coil 310-C and the extended transmitter coil 310-D may be enhanced thereby leading in faster charging of the sensors 104.

Exemplary embodiments discussed above may provide certain advantages. Though not required to practice aspects of the application, these advantages may include those provided by the following features.

Some embodiments of the present application enable a wireless charging system and/or apparatus for simultaneous charging of multiple battery-powered devices.

Some embodiments of the present application enable a wireless portable charging device (in form of a pouch) capable of simultaneously charging one or more battery-powered devices embedded within said portable charging device.

Some embodiments of the present application enable a wireless charging system and/or apparatus for charging the battery-powered devices by establishing a resonant coupling between the coils present within the wireless charging system and the battery-powered devices.

Some embodiments of the present application enable the wireless charging system and/or apparatus to facilitate the emission of magnetic flux generated by a coil within the charging device to a coil within the battery cell of the battery-powered device thereby facilitating the coil within the battery cell to induce current based on electromagnetic induction principle in order to charge the battery cell of the battery-powered device.

Some embodiments of the present application enable a wireless charging system and/or apparatus for charging of multiple battery-powered devices even though the alignment between the coils of the wireless charging system and the battery-powered devices is at different angles and distances.

Although implementations for system, apparatus and method for facilitating wireless charging of one or more battery-powered devices have been described in language specific to structural features and/or methods, it is to be understood that the appended claims are not necessarily limited to the specific features or methods described. Rather, the specific features and methods are disclosed as examples of implementations for facilitating wireless charging of one or more battery-powered devices.

While the present patent application has been shown and described with particular references to a number of embodiments thereof, it should be noted that various other changes or modifications may be made without departing from the scope of the present application.

What is claimed is:

1. A wireless charging system, comprising:
a charging device comprising multiple first charging coils,
wherein at least one first charging coil is positioned at a predefined extended distance from at least one other first charging coil,
wherein the at least one first charging coil and the at least one other first charging coil are magnetically coupled coils having a high quality factor and are resonated at same resonant frequency, and
wherein multiple cycles of resonance is implemented between the at least one first charging coil and the at least one other first charging coil to continuously emit magnetic flux generated by the at least one first charging coil to the at least one other first charging coil in response to power supplied to the at least one first charging coil; and
multiple battery-powered devices embedded within the charging device, wherein a battery cell of each of the multiple battery-powered devices comprises a second charging coil,
wherein the continuous magnetic flux emitted based upon a multiple resonant coupling formed between the at least one first charging coil and the at least one other first charging coil via the multiple cycles of resonance leads to back and forth transfer of energy between the at least one first charging coil and the at least one other first charging coil;
wherein the back and forth transfer of energy induces an electric current within the multiple battery-powered devices;
wherein the electric current induced is utilized for simultaneously charging the battery cell of each of the multiple battery-powered devices;
wherein one of the multiple first charging coils comprises a controller and an oscillating control unit;
wherein the oscillating control unit of the one of the multiple first charging coils ensures that magnetic flux generated by the one of the multiple first charging coils oscillates with the same resonant frequency; and
wherein the controller is configured to continuously monitor the status of the resonant coupling between the one of the multiple first charging coil and the second charging coil.

2. The wireless charging system of claim 1, wherein the charging device is in form of a pouch, wherein the power is supplied to the charging device using a power source connected to the charging device via a wired connection.

3. The wireless charging system of claim 1, wherein the multiple battery-powered devices are selected from smartphones, tablet computers, wearable devices and combinations thereof.

4. The wireless charging system of claim 3, wherein the multiple battery-powered devices are loosely coupled with the charging device, and wherein the loose coupling between the multiple battery-powered devices and the charging device enables the second charging coil to orient in random directions within the battery cell thereby deviating the alignment between the multiple first charging coils and the second charging coil.

5. The wireless charging system of claim 4, wherein the resonant coupling enables the magnetic flux generated by the multiple first charging coils and the magnetic flux received by the second coil to resonate at a same frequency and forming a resonated LC circuit.

6. The wireless charging system of claim 5, wherein an efficiency of electric current induced by the magnetic flux received via the resonant coupling is based upon a coupling coefficient and a quality factor between the multiple first charging coils and the second charging coil.

7. The wireless charging system of claim 6, wherein the at least one first charging coils is positioned at the predefined extended distance from the at least one other first charging coil such that the second charging coil is positioned in between the at least one first charging coil and the at least one other first charging coil, and wherein the second charging coil receives the continuous magnetic flux emitted based upon the multiple resonant coupling formed between the at least one first charging coil and the at least one other first charging coil.

8. The wireless charging system of claim 6, wherein the at least one first charging coil and the at least one other first charging coil are magnetically coupled coils having a high quality factor, and wherein the at least one first charging coil and the at least one other first charging coil resonates at a same frequency.

9. The wireless charging system of claim 8, wherein the at least one other first charging coil operates as a resonator capable of enhancing strength of the magnetic flux generated by the at least one first charging coil via a resonance effect, and wherein the magnetic flux, with enhanced strength, is received by the second charging coil thereby enhancing the electric current induced within the multiple battery-powered devices.

10. The wireless charging system of claim 2, wherein the charging device in form of a pouch improves alignment of the multiple battery-powered devices to the charging device when the said multiple battery-powered devices are randomly folded within the charging device.

11. A method for facilitating wireless charging of multiple battery-powered devices, the method comprising:
    providing a wireless system comprising a charging device embedded with multiple battery-powered devices, wherein the charging device comprises multiple first charging coils, wherein at least one first charging coil is positioned at a predefined extended distance from at least one other first charging coil, and wherein the multiple battery-powered devices comprise a second charging coil,
        wherein the at least one first charging coil and the at least one other first charging coil are magnetically coupled coils having a high quality factor and are resonated at same resonant frequency;
    continuously emitting magnetic flux generated by the at least one first charging coil to the at least one other first charging coil by implementing multiple cycles of resonance,
        wherein the continuous emission of the magnetic flux leads to back and forth transfer of energy between the at least one first charging coil and the at least one other first charging coil in response to power supplied to the at least one first charging coil; and
    inducing, by the back and forth transfer of energy between the at least one first charging coil and the at least one other first charging coil, an electric current within the multiple battery-powered devices,
        wherein the electric current induced is utilized for simultaneously charging a battery cell of each of the multiple battery-powered devices;
        wherein one of the multiple first charging coils comprises a controller and an oscillating control unit;
        wherein the oscillating control unit of the one of the multiple first charging coils ensures that magnetic flux generated by the one of the multiple first charging coils oscillates with the same resonant frequency; and
        wherein the controller is configured to continuously monitor the status of the resonant coupling between the one of the multiple first charging coil and the second charging coil.

12. The method of claim 11 further comprising positioning the at least one first charging coil at a predefined extended distance from the at least one other first charging coil such that the second charging coil is positioned in between the at least one first charging coil and the at least one other first charging coil.

13. The method of claim 12 further comprising receiving, by the second charging coil, the magnetic flux generated by the at least one first charging coil having stronger coupling effect with the second charging coil.

14. The method of claim 11 further comprising magnetically coupling at least one first charging coil and the at least one other first charging coil having a high quality factor, and wherein the at least one first charging coil and the at least one other first charging coil resonates at a same frequency.

15. The method of claim 14 further comprising enabling the at least one other first charging coil to operate as a resonator configured for enhancing strength of the magnetic flux generated by the at least one first charging coil via a resonance effect, and wherein the magnetic flux, with enhanced strength, is received by the second charging coil thereby enhancing the electric current induced within the multiple battery-powered devices.

16. A wireless charging apparatus, comprising:
    a charging device accommodating multiple battery-powered devices, wherein the charging device further comprises multiple first charging coils, wherein the at least one first charging coil is positioned at a predefined extended distance from the at least one other first charging coil,
        wherein the at least one first charging coil and the at least one other first charging coil are magnetically coupled coils having a high quality factor and are resonated at same resonant frequency, and
        wherein multiple cycles of resonance is implemented between the at least one first charging coil and the at least one other first charging coil to continuously emit magnetic flux generated by the at least one first charging coil and received by the at least one other first charging coil,
    the multiple battery-powered devices embedded within the charging device, wherein a battery cell of each of the multiple battery-powered devices comprises a second charging coil,
        wherein the continuous magnetic flux emitted based upon a multiple resonant coupling formed between the at least one first charging coil and the at least one other first charging coil via the multiple cycles of resonance leads to back and forth transfer of energy between the at least one first charging coil and the at least one other first charging coil in response to power supplied to the at least one first charging coil,
    wherein the back and forth transfer of energy induces an electric current within the multiple battery-powered devices;
    wherein the electric current induced is utilized for charging the battery cell of each of the multiple battery-powered devices;

wherein the charging device further comprises a display interface for indicating the status of the charging of the battery cell of each of the multiple battery-powered devices; and a power source for supplying the power to the charging device and the display interface, wherein the power source is further connected to the charging device via a wired connection, wherein one of the multiple first charging coils comprises a controller and an oscillating control unit;

wherein the oscillating control unit of the one of the multiple first charging coils ensures that magnetic flux generated by the one of the multiple first charging coils oscillates with the same resonant frequency; and wherein the controller is configured to continuously monitor the status of the resonant coupling between the one of the multiple first charging coil and the second charging coil.

17. The wireless charging apparatus of claim 16, wherein the multiple battery-powered devices are selected from smartphones, tablet computers, wearable devices and combinations thereof.

18. The wireless charging apparatus of claim 16, wherein the power source is one of a power adaptor or a USB port or a battery pack.

19. The wireless charging apparatus of claim 16, wherein the display interface is a Light Emitting Diode (LED).

20. The wireless charging apparatus of claim 16, wherein the charging device is in form of a pouch, and wherein the charging device improves alignment of the multiple battery-powered devices to the charging device when the said multiple battery-powered devices are randomly folded within the charging device.

* * * * *